(12) United States Patent
Amiri et al.

(10) Patent No.: US 9,717,014 B1
(45) Date of Patent: Jul. 25, 2017

(54) CROSS-NETWORK TRAFFIC MANAGEMENT OF NEIGHBORING WLANS

(71) Applicant: Quantenna Communications, Inc., Fremont, CA (US)

(72) Inventors: Bahador Amiri, Los Gatos, CA (US); Steve Schultz, Danville, CA (US); James Timothy Herbert, Hornsby (AU)

(73) Assignee: Quantenna Communications, Inc., Fremont, CA (US)

( * ) Notice: Subject to any disclaimer, the term of this patent is extended or adjusted under 35 U.S.C. 154(b) by 135 days.

(21) Appl. No.: 14/540,013

(22) Filed: Nov. 12, 2014

Related U.S. Application Data (60) Provisional application No. 61/903,146, filed on Nov. 12, 2013.

(51) Int. Cl.
| | | |
|---|---|---|
| *H04L 12/28* | (2006.01) | |
| *H04W 28/02* | (2009.01) | |
| *H04W 28/06* | (2009.01) | |
| *H04W 84/12* | (2009.01) | |

(52) U.S. Cl.
CPC ... *H04W 28/0252* (2013.01); *H04W 28/0268* (2013.01); *H04W 28/065* (2013.01); *H04W 84/12* (2013.01)

(58) Field of Classification Search
CPC .......... H04W 28/0252; H04W 28/0268; H04L 47/10; H04L 43/50

USPC ......................................................... 370/338
See application file for complete search history.

(56) References Cited

U.S. PATENT DOCUMENTS

| | | | |
|---|---|---|---|
| 8,462,751 B1 | 6/2013 | Dehghan et al. | |
| 8,902,769 B1 | 12/2014 | Dehghan et al. | |
| 8,902,777 B1* | 12/2014 | Huang | H04W 28/0205 370/252 |
| 2003/0123430 A1* | 7/2003 | Hollatz | H04L 12/4612 370/352 |
| 2010/0329263 A1* | 12/2010 | Tischer | H04L 12/66 370/392 |

* cited by examiner

*Primary Examiner* — Wei Zhao
(74) *Attorney, Agent, or Firm* — IP Creators; Charles C Cary (57) ABSTRACT

A traffic management system for managing communication traffic on wireless local area networks (WLAN)s. The traffic management system comprises: a traffic aggregator and a traffic prioritizer. The traffic aggregator is configured to aggregate traffic management parameters from neighboring ones of the WLANs which share a selected communication channel with one another for communication links between their associated wireless access point (WAP) node and station nodes. The traffic prioritizer is coupled to the traffic aggregator and configured to prioritize the communication traffic of the neighboring ones of the WLANs using the aggregated traffic management parameters; thereby avoiding impediments to high priority communication traffic on a one of the neighboring networks resulting from a lack of prioritization coordination with an other of the neighboring networks.

8 Claims, 6 Drawing Sheets

PRIOR ART: TRAFFIC MANAGEMENT

Arbitrated Inter WLAN Traffic Re-Prioritization

Arbitrated Inter WLAN Traffic Re-Prioritization

FIG. 6  Traffic Management between Neighboring WLANs

CROSS-NETWORK TRAFFIC MANAGEMENT OF NEIGHBORING WLANS

CROSS REFERENCE TO RELATED APPLICATION

This application claims the benefit of prior filed Provisional Application No. 61/903,146 filed on Nov. 12, 2013 entitled "Method and Apparatus for Cross-Network Traffic Management of Neighboring WLANs for Quality of Service (QOS)" which is incorporated herein by reference in its entirety as if fully set forth herein.

BACKGROUND OF THE INVENTION

1. Field of Invention

The field of the present invention relates in general to wireless local area networks (WLAN) including wireless access points (WAP) and wireless stations and methods for traffic management of same.

2. Description of the Related Art

Home and office networks, a.k.a. wireless local area networks (WLAN) are established and serviced using a device called a Wireless Access Point (WAP). The WAP may include a router. The WAP wirelessly couples all the devices of the home network, e.g. wireless stations such as: computers, printers, televisions, digital video (DVD) players, security cameras and smoke detectors to one another and to the Cable or Subscriber Line through which Internet, video, and television is delivered to the home. Most WAPs implement the IEEE 802.11 standard which is a contention based standard for handling communications among multiple competing devices for a shared wireless communication medium on a selected one of a plurality of communication channels. The frequency range of each communication channel is specified in the corresponding one of the IEEE 802.11 protocols being implemented, e.g. "a", "b", "g", "n", "ac", "ad", "ax". Communications follow a hub and spoke model with a WAP at the hub and the spokes corresponding to the wireless links to each 'client' device.

After selection of a single communication channel for the associated home network, access to the shared communication channel relies on a multiple access methodology identified as Collision Sense Multiple Access (CSMA). CSMA is a distributed random access methodology first introduced for home wired networks such as Ethernet for sharing a single communication medium, by having a contending communication link back off and retry access to the line if a collision is detected, i.e. if the wireless medium is in use.

Communications on the single communication medium are identified as "simplex" meaning, one communication stream from a single source node to one or more target nodes at one time, with all remaining nodes capable of "listening" to the subject transmission. To confirm arrival of each communication packet, the target node is required to send back an acknowledgment, a.k.a. "ACK" packet to the source. Absent the receipt of the ACK packet the source will retransmit the unacknowledged data until an acknowledgement is received, or a time-out is reached.

To support the advent of streaming video over a wireless network, the Wireless Multi Media (WMM) and IEEE 802.11e standards added prioritization of traffic based on content type to allow real time audio and video traffic higher priority access to the contention based WLAN than the priority accorded to non real time data, such as a file transfer, e.g. File Transfer Protocol (FTP). The prioritization was achieved by creating different content queues for audio, video and data communication traffic. The higher priority content queues have smaller fixed backoff times and larger maximum packet size limits as established by the IEEE 802.11e standard. The higher priority content queues are said to assure a higher Quality of Service (QOS) for their associated audio or video queues.

What is needed is an improved method of traffic management on a residential or business WLAN.

SUMMARY OF THE INVENTION

The present invention provides a method and system for traffic management for wireless local area networks (WLAN)s. In an embodiment of the invention a traffic management system for managing communication traffic on wireless local area networks (WLAN)s is disclosed. The traffic management system comprises: a traffic aggregator and a traffic prioritizer. The traffic aggregator is configured to aggregate traffic management parameters from neighboring ones of the WLANs which share a selected communication channel with one another for communication links between their associated wireless access point (WAP) node and station nodes. The traffic prioritizer is coupled to the traffic aggregator and configured to prioritize the communication traffic of the neighboring ones of the WLANs using the aggregated traffic management parameters; thereby avoiding impediments to high priority communication traffic on a one of the neighboring networks resulting from a lack of prioritization coordination with an other of the neighboring networks.

The invention may be implemented in hardware, firmware or software.

Associated methods are also claimed.

BRIEF DESCRIPTION OF THE DRAWINGS

These and other features and advantages of the present invention will become more apparent to those skilled in the art from the following detailed description in conjunction with the appended drawings in which.

DETAILED DESCRIPTION OF TH EMBODIMENTS

FIGS. 1A, 1C and 1B, 1D are plan views of residential wireless local area networks (WLAN)s together with associated exploded hardware block diagrams respectively of prior art WLAN traffic management.

Figure 1A:
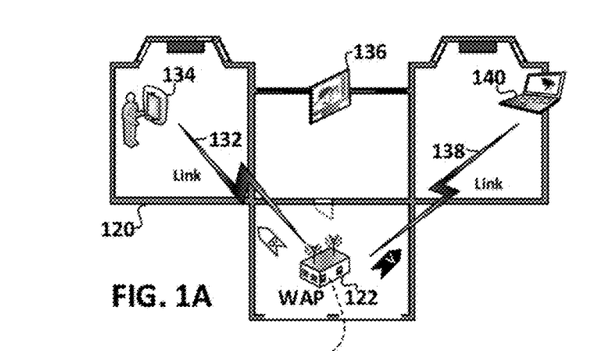
FIGS. 1A, 1C and 1B, 1D are plan views of residential wireless local area networks (WLAN)s together with associated exploded hardware block diagrams respectively of prior art WLAN traffic management.
Figure 1B:
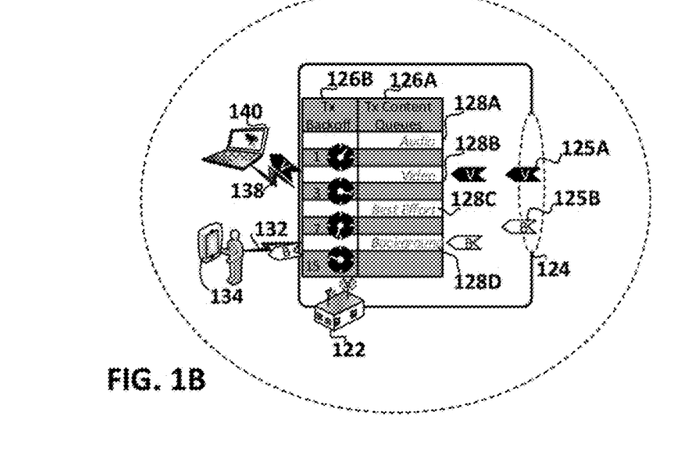

FIG. 1A shows residence 120 with a WLAN comprising wireless access point (WAP) 122, and wireless stations, i.e. wireless tablet computer 134, wireless TV 136, and wireless notebook computer 140. Communication link 132 between WAP 122 and tablet 134 and communication link 138 between WAP 122 and notebook computer 140 are shown. FIG. 1B is an exploded hardware block diagram of prior art WLAN traffic management on WAP 122. WLAN traffic management as proscribed in the Wireless Multi Media (WMM) and IEEE 802.11e standards supports fixed prioritization by content type of the traffic handled by WAP 122 or by the stations. Each network node, i.e. WAP or station has four content queues 126A each associated with a different access priority. As content 124, e.g. video 125A and file transfer 125B arrives at the WAP 122 the Real time content such as audio and video are put in the first and second content queues 128A, 128B respectively while non real time data, such as a web pages and FTP file transfers are placed in the third and fourth content queues 128C, 128D respectively. In the example shown incoming video content 125A is places in the video content queue 128B and the FTP file transfer 125B is placed in the background content queue 128D. The prioritization of WLAN access is achieved by associated processes 126B which accord smaller fixed back off times and larger maximum packet size limits as established by the IEEE 802.11e standard to the higher priority content queues. Transmit backoff is expressed in term of time slots in milliseconds with the four content queues having initial respective contention based transmit backoff time slots of 1, 3, 7 and 15 respectively from the highest to the lowest content priority. The higher priority content queues are said to assure a higher Quality of Service (QOS) for their associated audio or video queues.

Figure 1C:
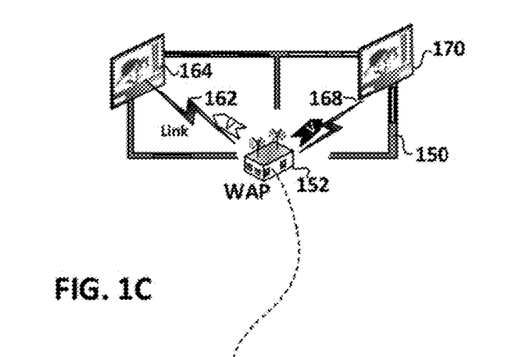
Figure 1D:
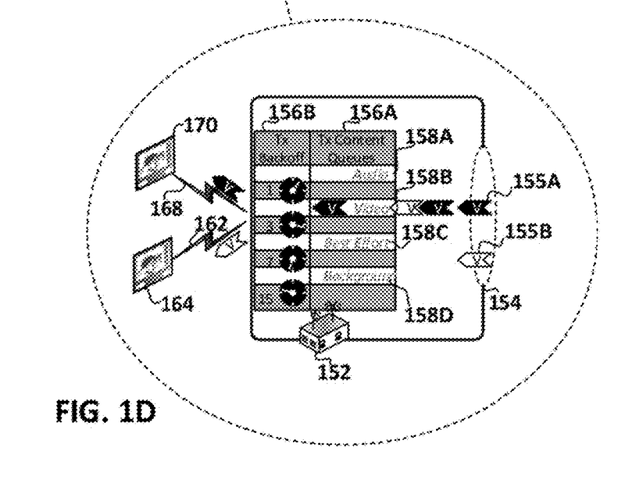

FIG. 1C shows residence 150 with a WLAN comprising wireless access point (WAP) 152, and wireless stations, i.e. wireless TV 164, and wireless TV 170. Communication link 162 between WAP 152 and TV 164 and communication link 168 between WAP 152 and TV 170 are shown. FIG. 1D is an exploded hardware block diagram of prior art WLAN traffic management on WAP 152. WLAN traffic management supports fixed prioritization by content type. Each network node, i.e. WAP or station has four content queues 156A each associated with a different access priority. As content 154, e.g. video 155A and video 155B arrives at the WAP 152 any real time content such as audio and video are put in the first and second content queues 158A, 158B respectively while non real time data, such as a web pages and FTP file transfers are placed in the third and fourth content queues 158C, 158D respectively. In the example shown incoming video content 155A and 155B are both placed in the video content queue 158B. The prioritization of WLAN access is achieved by associated processes 156B which accord smaller fixed back off times and larger maximum packet size limits as established by the IEEE 802.11e standard to the higher priority content queues. Transmit backoff is expressed in term of time slots in milliseconds with the four content queues having initial respective contention based transmit backoff time slots of 1, 3, 7 and 15 respectively from the highest to the lowest content priority. In this case there is only real time video content so all downstream traffic is sent using the second content queue 158B using the associated backoff time of "3" time slots and associated maximum packet sizes.

Figure 2A:
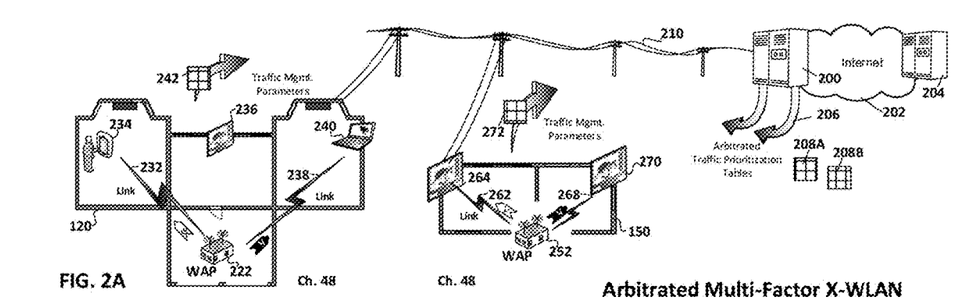
FIGS. 2A-2B are a system plan view and data structure diagrams respectively of a cross WLAN traffic management system in accordance with an embodiment of the current invention.
Figure 2B:
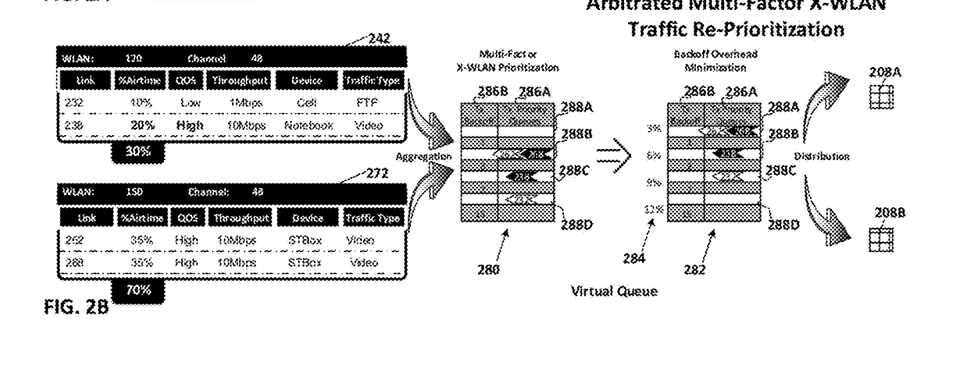

FIGS. 2A-2B are a system plan view and data structure diagrams respectively of a cross WLAN traffic management system in accordance with an embodiment of the current invention.

FIG. 2A is a system plan view showing neighboring residences 120 and 150 coupled to the Internet 202 via a Telco backbone, e.g. digital subscriber line (DSL) 210, to Telco or Internet Service Provider (ISP) 200. A $3^{rd}$ party content provider 204 is also shown coupled to the Internet 202. Residence 120 includes a WLAN comprising WAP 222, and wireless stations, i.e. wireless tablet computer 234, wireless TV 236, and wireless notebook computer 240. Communication link 232 between WAP 222 and tablet 234 and communication link 238 between WAP 222 and notebook computer 240 are shown. Residence 150 includes a WLAN comprising WAP 252, and wireless stations, i.e. wireless TV 264, and wireless TV 270. Communication link 262 between WAP 252 and TV 264 and communication link 268 between WAP 252 and TV 270 are shown.

Each WAP is, in an embodiment of the invention, compliant with the IEEE 802.11 standard and thus is able to select any communication channel from a plurality of orthogonal frequency division multiplexed (OFDM) communication channels for the WLAN. If they select different channels then traffic management may be handled by each WLAN independently. Where, however, both WAPs have selected the same channel, e.g. channel "48" they may be forced to share the channel if they are physically located proximate to one another so that their radio frequency (RF) signal footprints overlap with one another. In the example shown in FIG. 2A WAPs 222, 252 are proximate to one another and are sharing the same communication channel, i.e. competing for access to channel "48". Thus, when WAP 222 is transmitting data on link 238, the neighboring WAP 252, will detect that the channel is in use and will back off its attempts to access the channel "48" for a specified increment of time. This collision detection and transmit backoff precedes each WLAN's WAP and or stations access to the shared communication channel.

In this embodiment of the invention traffic management is escalated to the "Cloud", e.g. Telco/ISP 200. In an embodiment of the invention the escalation occurs at the instigation of a WAP experiencing limitations in its individual traffic management efforts. In an other embodiment of the invention the escalation occurs at as a result of continuous monitoring or polling by the Telco/ISP. In either case, each WAP provides traffic management information/parameters to the Telco 200 to facilitate its aggregated traffic management. WAP 222 is shown periodically providing traffic management parameters 242 for its WLAN to Telco 200. WAP 252 is shown periodically providing traffic management parameters 272 for its WLAN to Telco 200. Traffic management parameters may include any one or all of the following: a) WLAN service type, e.g. premium vs. basic; b) WLAN access protection type, e.g. public vs. private; c) communication traffic provider type, e.g. Netflix, YouTube vs. Comcast; d) link efficiency, e.g. packet error rate (PER), throughput, modulation and coding schema (MCS), percent airtime; and e) link target device type, e.g. notebook computer or set-top box. The Telco aggregates these traffic management parameters and uses any one or all of them singly or in combination to prioritize all the traffic on both neighboring WLANs in residences 120 and 150 which share the same communication channel. The parameters used in prioritization may depend on the amount of remaining unused, a.k.a. available airtime on the shared channel. For example, where unused airtime is severely constrained all traffic on the WLAN in a residence owned by a premium subscriber may be given priority over that of the traffic on the neighboring WLAN whose subscriber has paid for only basic service. Alternately, where unused airtime is less severely constrained, video traffic targeted for a set top box may be given higher access priority than video traffic targeted for a notebook computer. Once all traffic has been prioritized for both WLANs the corresponding prioritization tables 208A-B are downloaded 206 from the Telco 200 to each of the neighboring WAPs 222, 252.

FIG. 2B is a data structure diagram of the cross WLAN traffic management system shown in FIG. 2A. Some representative traffic management parameters 242 and 272 as sent by WAPs 222, and 252 respectively to the Telco are shown. In the example shown, links 232 and 238 on WAP 222 in residence 120 consume 30% of the airtime on channel 48. Links 262 and 268 on WAP 252 in residence 150 consume 70% of the airtime on channel 48. Thus there is no remaining free, unused airtime on channel 48, jeopardizing the stable operation of both WLANs. The traffic management parameters from both WLANs are aggregated by the Telco. The Telco then decides based on the severity of the airtime constraint among available prioritization schema for increasing available unused airtime and returning the neighboring WLANs to more stable performance. In the example shown the Telco in a first step of multi-factor prioritization accords different priorities for video on links 262, 268 targeted to HDTVs 264, 270 respectively then to the video on link 238 targeted to the notebook computer 240. This prioritization schema results in a joint prioritization table 280. The prioritization table includes a set 286A of virtual queues 288A-D, a.k.a. prioritization classes or categories, each associated with a corresponding transmit backoff time 286B and or maximum burst packet size. The video on links 238 targeting notebook computer 240, is given a lower access priority 288C, than the video on links 262,268 targeting the HDTVs 264, 270 respectively which is given the next higher access priority 288B.

After this initial prioritization is performed the next processing step is to retain the relative prioritization but to minimize overhead associated with the initial prioritization classes or categories. In the example shown there is no traffic on either WLAN in the highest priority access class 288A. Thus 3-6% of airtime will be wasted on an unnecessarily large backoff time resulting from placing the highest priority traffic in any queue other than the highest priority access queue or category. Column 284 shows the relative differences in backoff related overhead amount, i.e. wasted airtime, associated with the four different prioritization classes. The empty queue 288A in table 280 is filled in prioritization table 282 by migrating each lower priority queue to an adjacent empty higher priority queue where possible. Thus the same relative priorities are maintained but with minimum backoff times and maximum associated packet sizes. After joint prioritization the associated prioritization sub-tables 208A, 208B are downloaded from the Telco or ISP to the corresponding WAPs.

Figure 3A:
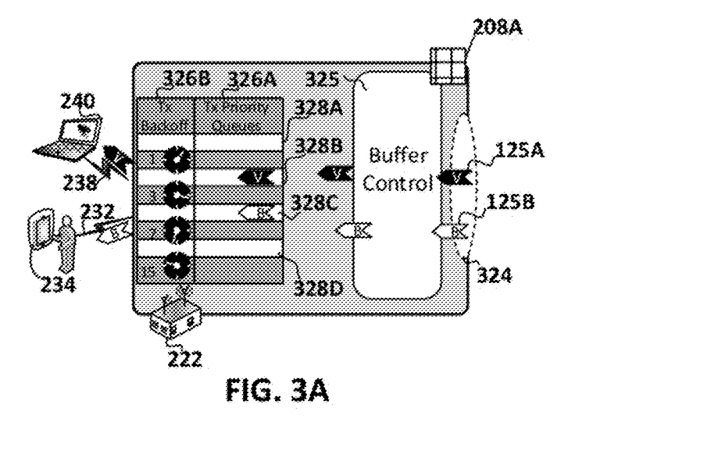
FIGS. 3A-3B are exploded hardware block diagrams of the WLAN portion of the traffic management system shown in FIGS. 2A-2B.
Figure 3B:
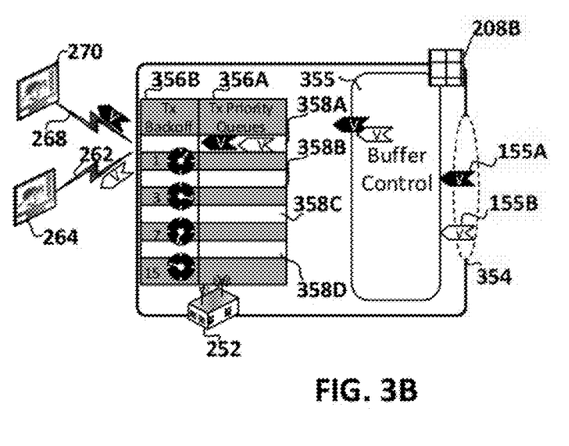

FIGS. 3A-3B are exploded hardware block diagrams of the WLAN portion of the traffic management system shown in FIGS. 2A-2B. In FIG. 3A the set 326A of priority queues 328A-D and associated transmit backoff times and packet sizes 326B on WAP 222 are shown. A buffer control 325 loads the incoming downlink traffic 324, i.e. video stream 125A and FTP data 125B into the priority queues designated in the prioritization sub-table 208A received from the Telco. Video stream 125A is loaded into priority queue 328B. FTP data 125B is loaded into priority queue 328C.

In FIG. 3B the set 356A of priority queues 358A-D and associated transmit backoff times and packet sizes 356B on WAP 252 are shown. A buffer control 355 loads the incoming downlink traffic 354, i.e. video streams 155A and 155B into the priority queues designated in the prioritization sub-table 208B received from the Telco. Video streams 155A and 155B are both loaded into the highest priority queue 358A. This will improve the channel access for these HDTV video streams relative to the video stream on WAP 222 targeted to notebook computer 240.

In an alternate embodiment of the claimed invention the number of virtual priority categories/classes on the Telco will be increased provided there is corresponding support on one or more of the associated neighboring WAPs for an increased number of priority queues or buffers. In still another embodiment of the of the claimed invention the backoff times and or maximum burst packet sizes may be adjusted independently on one neighboring WAP relative to the other, thus providing further 'granularity' in the joint prioritization of traffic on neighboring WLANs. In still another embodiment of the claimed invention, aggregation and prioritization is performed on a peer-to-peer basis between the neighboring WAPs which share traffic management parameters and collectively settle on a single joint aggregate traffic management schema with the associated priorities for each WLAN. In still another embodiment of the claimed invention, the joint prioritization table may alternately, indicate to the associated control buffer that one or more content streams should be throttled by the buffer control of the associated WAP. Throttling of a stream may be effected directly by the buffer control by dropping packets of the associated content stream before transmission. Throttling of a stream may be effected indirectly by the buffer control signaling the $3^{rd}$ party content provider of a designated stream to reduce the throughput required for the designated stream, by for example reducing the resolution thereof.

Figure 4A:
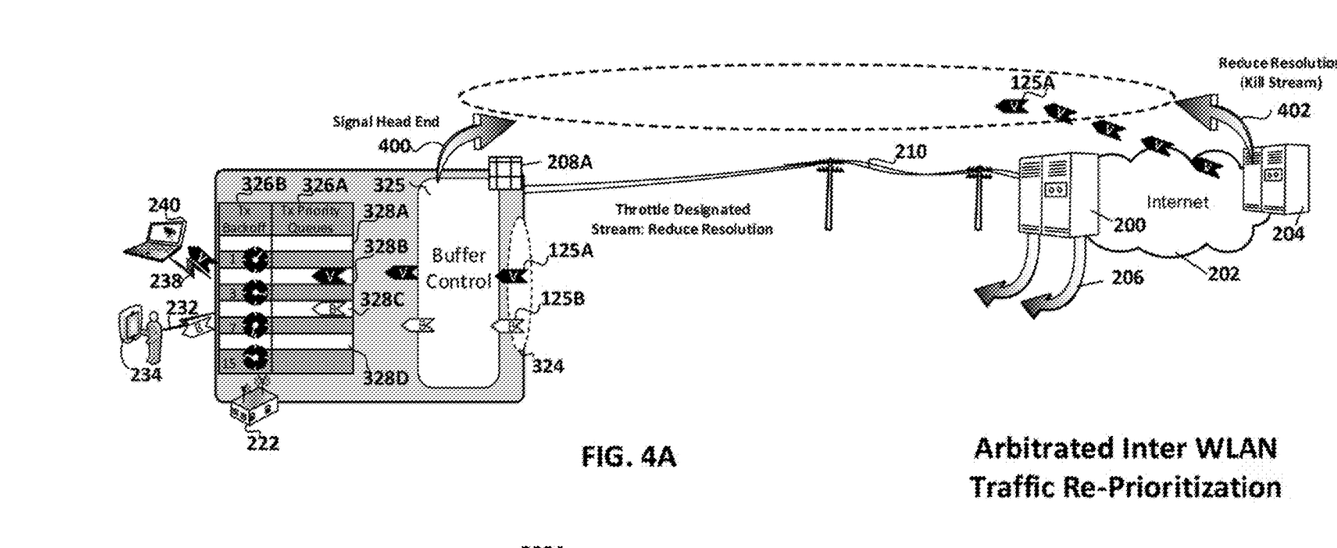
FIGS. 4A-4B are exploded hardware block diagrams of alternate embodiments of the WLAN portion of the traffic management system shown in FIGS. 3A.
Figure 4B:
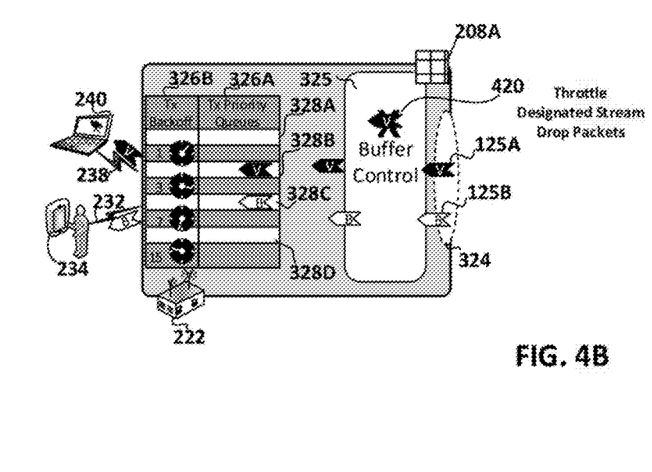

FIGS. 4A-4B are exploded hardware block diagrams of alternate embodiments of the WLAN portion of the traffic management system shown in FIG. 3A. In FIG. 4A the buffer control 325 as dictated by the prioritization sub-table 208A undertakes the throttling of the video stream 125A at its source, e.g. the $3^{rd}$ party content provider 204. The buffer control signals 400 the $3^{rd}$ party provider 204 and in response 402 the video stream 125A is reduced in resolution, e.g. pixel count, or color pallet. In FIG. 4B the buffer control 325 as dictated by the prioritization sub-table 208A undertakes the throttling of the video stream 125A by dropping 420 selected packets thereof.

Figures 5A, 5B, 5C:
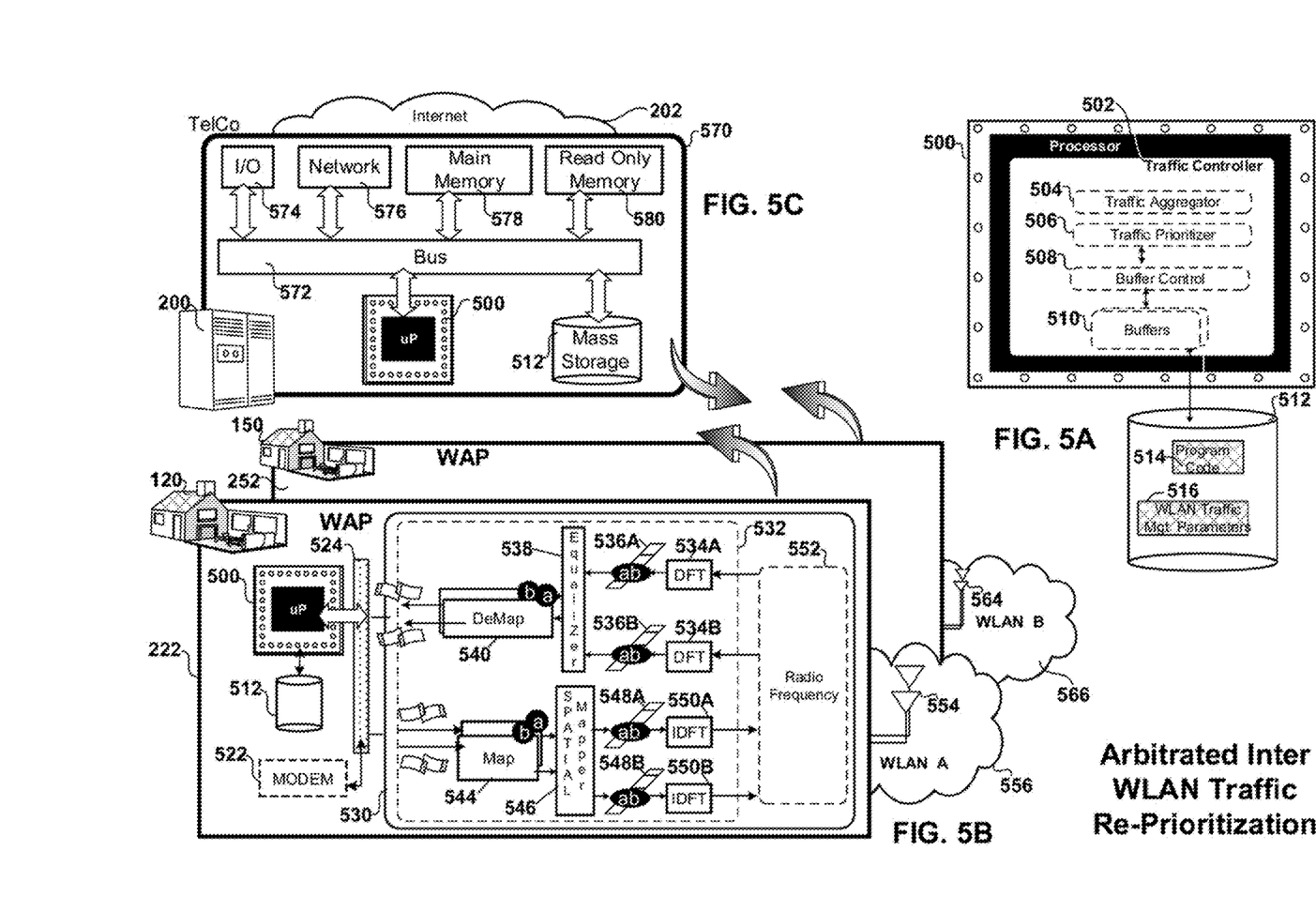
FIGS. 5A-5C are hardware block diagrams of various devices configured to execute the cross network traffic management of WLANs in accordance with an embodiment of the current invention.

FIGS. 5A-5C are hardware block diagrams of various devices configured to execute the cross network traffic management of WLANs in accordance with an embodiment of the current invention.

FIG. 5A shows a processor 500 and memory element or storage module 512 configured to traffic management program code 514 associated with a WLAN traffic manager module 502. The program code may be configured to run on a single device or cooperatively on one or more host devices. The traffic manager module includes: a traffic aggregator 504, a traffic prioritizer 506, a buffer control 508, and buffers 510. In addition to program code, the storage module includes: WLAN traffic management parameters 516 aggregated from the WLANs.

In operation the traffic aggregator 504 aggregates traffic management parameters from neighboring ones of the WLANs which share a selected communication channel with one another for communication links between their associated wireless access point (WAP) node and station nodes. The traffic prioritizer 506 is coupled to the traffic aggregator and configured to prioritize the communication traffic of the neighboring ones of the WLANs using the aggregated traffic management parameters; thereby avoiding impediments to high priority communication traffic on a one of the neighboring networks resulting from a lack of prioritization coordination with an other of the neighboring networks. The traffic prioritizer is configured to minimize overhead associated with the prioritized communication traffic by reducing backoff times for at least one category of communication traffic within the prioritized communication traffic. In an embodiment of the invention the traffic aggregator determines available unused airtime for communication traffic on the neighboring WLANs and the traffic prioritizer limits prioritization of communication traffic to neighboring ones of the WLANs having available airtime below a threshold level. The buffer control 508 loads the transmit buffers/queues 510 with the designated prioritized traffic where each buffer is associated with a different traffic priority relative to the other buffers.

FIG. 5B shows a wireless access point (WAP) 222 configured as a host device within a residence 120 servicing a WLAN 556 which includes a plurality of station nodes (not shown). The WAP supports discrete communications with each station, e.g. wireless TVs, wireless computers, wireless notebooks, or concurrent multiple user multiple-input multiple-output (MU-MIMO) communications with multiple stations. The WAP 222 in this embodiment of the invention is identified as a 2×2 WAP supporting as many as 2 discrete communication streams "a", "b" over two antennas 554. The WAP 222 includes: the processor 500 and storage 512; a bus 524, a WLAN stage 530 including a base band stage 532, a radio frequency (RF) stage 552 and antennas 554. The WAP RF stage supports one or more IEEE 802.11 wireless local area network (WLAN) protocols. The WAP also includes a modem 522 for coupling via copper or fiber to a Telco or Internet Service Provider (ISP) 200. The processor in addition to supporting the IEEE 802.11 WAP functionality also executes the program code which provides traffic management functionality as discussed in connection with FIG. 5A.

In the baseband stage 532 transmitted communications for each user/station are encoded and scrambled. Each stream "a", "b" is subject to interleaving and constellation mapping in an associated interleaver mapper 544 and passed to the spatial mapper 546. The spatial mapper uses a beamsteering matrix determined to steer communications to the receiving station. The beamsteering matrix specifies specific phase and amplitude adjustments for the communications on each antenna designed to steering the outgoing communications toward the recipient station. The combined streams "ab" are injected into each of the orthogonal frequency division multiplexed (OFDM) tones or sub-channels 548A-B of the inverse discrete Fourier Transform (IDFT) modules 550A-B respectively. Each IDFT module is coupled via associated upconversion circuitry in the RF stage 552 to an associated one of the pair of antenna 554.

In the RF Stage 552 received communications "ab" on each of the two antenna 554 from user/station are downconverted and supplied as input to the baseband stage 532. In the baseband stage the received communications are then transformed from the time to the frequency domain in the discrete Fourier Transform (DFT) modules 534A-B from which they are output as discrete orthogonal frequency division multiplexed (OFDM) tones/sub-carriers/sub-channels 536A-B. All received streams are then subject to equalization in equalizer 538. Received steams "ab" are subject to de-interleaving and constellation demapping in associated deinterleaver demapper modules 540, followed by any required decoding and descrambling.

A neighboring WAP 252 in home 150 is also shown and is similarly configured to WAP 222. WAP 252 includes a pair of antenna 564 and supports communications on discrete WLAN 566. In an embodiment of the invention both WAPs share traffic management parameters with one another and using those parameters, jointly prioritize communications on their discrete WLANs when they are trying to share a single one of the communication channels with one another.

FIG. 5C shows a Telco or ISP 200 having a server 570 configured as a host device and coupled to the Internet 202. The server includes the processor 500 and storage 512; a bus 572, an input/output (I/O) module 574 for interfacing with a user, a network module 576 for coupling to a network, a main memory 578 for storing and executing program code and data, a read only memory 580 for storing bootup program code. The processor in addition to supporting the server functionality also executes the program code which provides spatial diagnostic functionality as discussed in connection with FIG. 5A. In an embodiment of the invention the WAPs 222, 252 performs initial aggregation of traffic management parameters from each station node on their associated WLANs and the server performs the final aggregation and prioritization of the communication traffic on both neighboring networks using the aggregated traffic management parameters.

Figure 6:
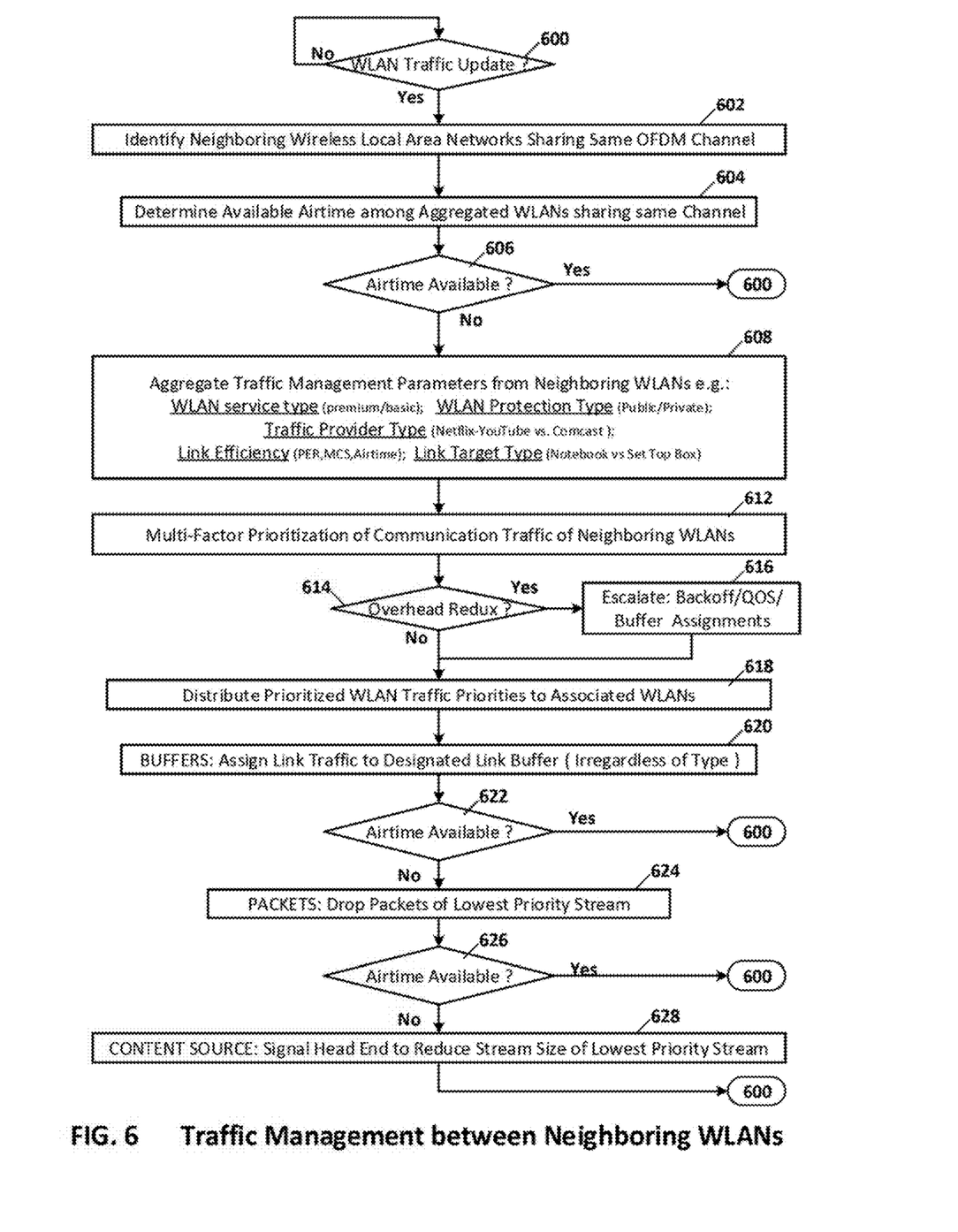
FIG. 6 is a process flow diagram of processes associated with cross-network traffic management between neighboring WLANs in accordance with an embodiment of the invention.

FIG. 6 is a process flow diagram of processes associated with cross-network traffic management between neighboring WLANs in accordance with an embodiment of the invention. Processing begins with decision process 600 in which a determination is made as to whether a WLAN traffic management update is required or has been received. In alternate embodiments of the invention these updates of traffic management parameters may be made on their own initiative by one or more WAPs or may be the result of polling by a Telco or ISP traffic management entity. If an affirmative determination as to a traffic management update is made then control passes to process 602. In process 602 neighboring WLANs sharing the same OFDM communication channel are identified. This identification can be based on traffic management parameters such as the service set identifier SSID of a neighboring network as reported by another network able to detect the SSID in the beacon interval of the network. Next in process 604 a determination is made as to the available airtime, a.k.a. unused airtime, on the selected channel. Then in decision process 606 a determination is made as to whether the unused airtime on the channel shared by the neighboring WLANs is above a threshold level. If it is, then no cross network prioritization is required and control returns to decision process 600. If however there is inadequate available airtime then control passes to process 608.

In process 608 the traffic management parameters from the neighboring networks are aggregated. These parameters may include one or more of the following: a) WLAN service type, e.g. premium vs. basic; b) WLAN access protection type, e.g. public vs. private; c) communication traffic provider type, e.g. Netflix, YouTube vs. Comcast; d) link efficiency. e.g. packet error rate (PER), throughput, modulation and coding schema (MCS), percent airtime; and e) link target device type, e.g. notebook computer or set-top box. Control is then passed to process 612. In process 612 one or more of these parameters is used in a multi-factor prioritization of the communication traffic on each of the neighboring WLANs, using the aggregated traffic management parameters. All traffic on a private WLAN may be accorded higher relative priority than on a neighboring public WLAN. Communication streams from one provider may be accorded higher priority than those from another provider. Communication streams targeting a set top box provided by the Telco or ISP may be provided higher priority that communication streams targeting the users notebook computer station. After prioritization control is passed to decision process 614.

In decision process 614 a determination is made vis a vis the prioritized communication traffic as to whether any of the associated prioritization queues, categories or classes is empty. If there are empty priority queues then control passes to process 616. In process 616 any remaining lower priority queues are escalated to the empty higher priority queue thus reducing unnecessarily large backoff times or unnecessarily small maximum packet sizes associated with the initial prioritization. Control then returns to process 618. In process 618 the associated portions of the WLAN traffic priorities, i.e. the prioritization tables/sub-tables are distributed to the corresponding WAP of each neighboring WLAN. Upon receipt the traffic priorities are used in process 620 to prioritize the actual communication traffic on each link services by each WAP. In an embodiment of the invention this involves loading the incoming traffic into the designated one of the priority buffers or queues for subsequent transmission over the corresponding one of the neighboring WLANs.

In an embodiment of the invention control then passes to decision process 622 to determine if available or unused airtime has increased to an acceptable level. If it has then control returns to decision process 600. If it has not then control passed to process 624. In process 624 each WAP or station may enable additional functionality to achieve the required prioritization, in this case by selectively dropping packets of the lowest priority stream.

In an embodiment of the invention control then passes to decision process 626 to determine if available or unused airtime has increased to an acceptable level. If it has then control returns to decision process 600. If it has not then control passed to process 628. In process 628 each WAP or station may enable additional functionality to achieve the required prioritization, in this case by signaling the content provider or head end of the lowest priority stream to reduce the throughput required to support the stream by for example reducing the resolution of the video or audio steam. Control then returns to decision process 600.

The components and processes disclosed herein may be implemented a software, hardware, firmware, or a combination thereof including program code software, a memory element for storing the program code software and a processor for executing the program code software, without departing from the scope of the Claimed Invention.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A traffic management system for managing communication traffic on wireless local area networks (WLAN)s each including a wireless access point (WAP) supporting wireless communications with associated stations on a selected one of a plurality of communication channels, and the traffic management system comprising:
    a traffic aggregator to aggregate traffic management parameters from neighboring ones of the WLANs which share the selected communication channel with one another and to determine if available airtime for communication traffic on the neighboring ones of the WLANs falls below a threshold level;
    a traffic prioritizer coupled to the traffic aggregator and responsive to a determination by the traffic aggregator of available airtime below the threshold level, to prioritize communication traffic on the neighboring ones of the WLANs using the aggregated traffic management parameters; thereby avoiding impediments to high priority communication traffic on a one of the neighboring networks resulting from a lack of prioritization coordination with an other of the neighboring networks.

2. The traffic management system of claim 1, further comprising:
    the traffic prioritizer further configured to detect an absence of a highest priority type of communication traffic on the neighboring ones of the WLANs and responsive thereto, to elevate a quality of service (QOS) and reduce the backoff times associated with transmitting remaining communication traffic.

3. A traffic management system for managing communication traffic on wireless local area networks (WLAN)s, and the traffic management system comprising:
    a traffic aggregator configured to aggregate traffic management parameters from neighboring ones of the WLANs which share a selected communication channel with one another for communication links between their associated wireless access point (WAP) node and station nodes; and further to determine available unused airtime for communication traffic on the neighboring ones of the WLANs; and
    a traffic prioritizer coupled to the traffic aggregator and configured to prioritize communication traffic on the neighboring ones of the WLANs using the aggregated traffic management parameters; thereby avoiding impediments to high priority communication traffic on a one of the neighboring networks resulting from a lack of prioritization coordination with an other of the neighboring networks, and further to limit prioritization of communication traffic to neighboring ones of the WLANs having available airtime below a threshold level.

4. The traffic management system of claim 1, further comprising:
    the traffic prioritizer further configured to accord distinct priorities to communication traffic on the neighboring ones of the WLANs, based on differences in WLAN subscriber service types between the neighboring ones of the WLANs.

5. A method for communication traffic management on wireless local area networks (WLAN)s each including a wireless access point (WAP) supporting wireless communications with associated stations on a selected one of a plurality of communication channels, and the method comprising:
    aggregating traffic management parameters from neighboring ones of the WLANs which share the selected communication channel with one another;
    determining if available airtime for communication traffic on the neighboring ones of the WLANs falls below a threshold level, based on the traffic management parameters aggregated in the aggregating act;

prioritizing communication traffic on the neighboring ones of the WLANs using the aggregated traffic management parameters; responsive to a determination in the determining act that available airtime on the neighboring ones of the WLANs falls below a threshold level; thereby avoiding impediments to high priority communication traffic on a one of the neighboring networks resulting from a lack of prioritization coordination with an other of the neighboring networks.

6. The method of claim 5, wherein the prioritizing act, further comprises:

detecting an absence of a highest priority type of communication traffic on the neighboring ones of the WLANs; and responsive to the detecting act;

elevating a quality of service (QOS) associated with remaining communication traffic; and reducing backoff times associated with transmitting the remaining communication traffic.

7. A method for communication traffic management on wireless local area networks (WLAN)s, and the method comprising:

aggregating traffic management parameters from neighboring ones of the WLANs which share a selected communication channel with one another for communication links between their associated wireless access point (WAP) node and station nodes;

determining available unused airtime for communication traffic on the neighboring ones of the WLANs;

prioritizing communication traffic on the neighboring ones of the WLANs using the aggregated traffic management parameters; thereby avoiding impediments to high priority communication traffic on a one of the neighboring networks resulting from a lack of prioritization coordination with an other of the neighboring networks; and limiting prioritization of communication traffic to neighboring ones of the WLANs having available airtime below a threshold level.

8. The method of claim 5, wherein the prioritizing act, further comprises:

according distinct priorities to communication traffic on the neighboring ones of the WLANs, based on differences in WLAN subscriber service types between the neighboring ones of the WLANs.

* * * * *